United States Patent Office 3,534,060
Patented Oct. 13, 1970

3,534,060
BICYCLO[5.1.0]OCTANE DERIVATIVES
John H. Fried, Palo Alto, Calif., assignor to Syntex Corporation, Panama, Panama, a corporation of Panama
No Drawing. Filed Aug. 25, 1966, Ser. No. 574,926
Int. Cl. C07d 27/04
U.S. Cl. 260—326.5                    10 Claims

ABSTRACT OF THE DISCLOSURE

This invention relates to 1-halo-2,7-disubstituted [5.1.0] octane derivatives which are useful in the control of fertility.

---

This invention relates to novel organic compounds and to processes for their preparation.

More specifically, the present invention pertains to bicyclo[5.1.0]octane derivatives, in particular to 1-halo-2,7-disubstituted-bicyclo[5.1.0]octan-2-ols, and to methods for preparing the same.

The compounds prepared in accordance with the present invention may be represented by the following structural formula:

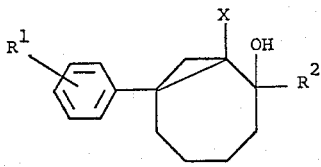

in which
$R^1$ is hydrogen, (lower)alkyl, (lower)alkoxy, di(lower)-alkylamino(lower)alkoxy or cycloalkyleneamino(lower)alkoxy;
$R^2$ is

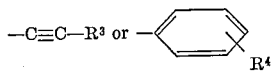

$R^3$ is hydrogen, chloro or methyl;
$R^4$ is hydrogen, (lower)alkyl, (lower)alkoxy, di(lower)alkylamino(lower)alkoxy or cycloalkyleneamino(lower)alkoxy; and
X is chloro or fluoro.

In the context of the present invention, the term "alkyl," and derivations thereof such as "alkoxy," "alkylene," and the like, refer to branched or straight chain hydrocarbon groups. When qualified by the term "(lower)," such groups will contain up to six carbons. Typical of such (lower)-alkyl groups are thus methyl, ethyl, propyl, i-propyl, butyl, hexyl and the like, and of such (lower)alkoxy groups are methoxy, ethoxy, butoxy and the like. The term "cycloalkyleneamino" refers to a 5 or 6 membered saturated, nitrogen-containing ring such as the N-pyrrolidino and N-piperidino groups.

The compounds of the present invention are useful in the control of fertility and in reversing the effects of estrogen in animals, thus being useful, for example, in combating bulling and nymphomania in cattle. Some of these compounds also demonstrate the ability to lower serum cholesterol levels. Generally these compounds are effective at a daily dosage of from about 0.1 mg. to about 10 mg. per kilogram of body weight and may be administered in conventional pharmaceutical forms, such as tablets, capsules, solutions, suspensions and the like, appropriate for the particular route of administration. In those cases in which one or more of $R^1$ and $R^4$ is an amino function, the compounds are often more suitably administered in the form of a non-toxic pharmaceutically acceptable acid addition salt. For this purpose any of the acids conventionally used in this regard, such as hydrochloric, sulfuric, citric, phosphoric, pamoic, acetic and the like, may be employed. The pharmacological properties of such salts are however a manifestation of the cationic form of these compounds of the present invention and not of the salt per se.

The compounds of the present invention are prepared from readily available starting materials, or starting materials easily prepared by conventional methods, through a four stage synthesis which may be represented as follows:

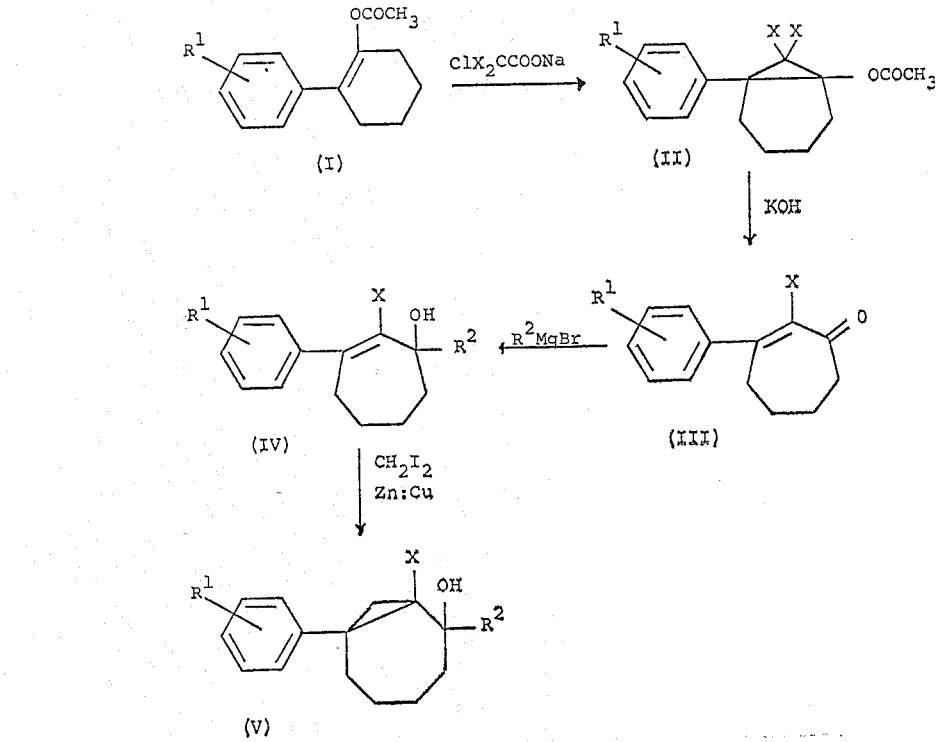

In the foregoing $R^1$, $R^2$ and X are as previously defined. According to the process of the present invention, the enol acetate of a cyclohexanone, substituted in the 2-position by a phenyl group or substituted phenyl group, is treated with the sodium salt of trichloroacetic acid or chlorodifluoroacetic acid at a temperature above 160°, generally in refluxing dimethyldiethylene glycol ether, to yield the 1-acetoxy-7,7-dihalobicyclo[4.1.0]heptane of Formula II. The enol acetate starting material (I) is readily obtained from the corresponding cyclohexanone by refluxing the same in acetic anhydride and sodium acetate under anhydrous conditions.

Treatment of the 1-acetoxy-7,7-dihalobicyclo[4.1.0]-heptane thus obtained with refluxing alcoholic base, such as methanolic potassium hydroxide, effects rupture of the bicyclic system and formation of the 1-substituted-2-halo-cyclohept-1-en-3-one (III).

This 1-substituted-2-halocyclohept-1-en-3-one is then alkylated, generally through the use of a suitable Grignard reagent such as an alkynylmagnesium bromide, phenylmagnesium chloride, or the like, preferably in tetrahydrofuran. Alternatively in those cases in which $R^2$ is an alkynyl group, including chloroethynyl, this alkylation can be effected with an alkali metal alkyne such as sodium or lithium acetylide.

These allylic carbinols (IV) not only are valuable intermediates for the preparation of the bicyclo[5.1.0]octan-2-ols of the present invention but also exhibit the biological activities as described above for these latter compounds.

After isolation, the allylic cyclohexane carbinol (IV) is subjected to the action of the reaction product of methylene iodide and a zinc:copper couple in accordance with the conventional Simmons-Smith reaction conditions. Thus obtained after isolation and purification, is the 1-halo-2,7-disubstituted-bicyclo[5.1.0]-octan-2-ol of Formula V.

In those instances in which the alkylation is conducted with a phenyl magnesium halide the final products will have the structure represented by Formula VI whereas when an alkynyl derivative is employed in this alkylation, the final products will have the structure represented by Formula VII:

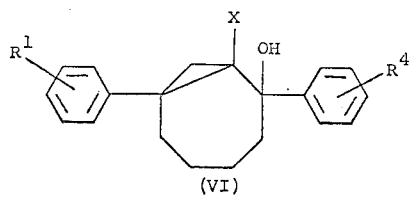

(VI)

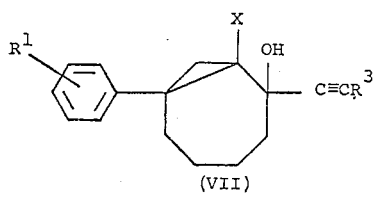

(VII)

In the above, $R^1$, $R^3$, $R^4$ and X are as previously defined. Particularly preferred compounds are those wherein $R^1$ and $R^4$ are p-methoxy or p-(N-pyrrolidinoethoxy) and $R^3$ is hydrogen or chloro.

The presence of "asymmetric" carbon atoms in the compounds of the present invention permits the existence of optical isomers and all such forms are included within the scope of the present invention. The configuration of the hydroxy substituent with reference to the carbon atom in the 8-position, is cis.

The following examples will serve to further typify the nature of the present invention but since these are presented solely for the purpose of illustration, they should not be construed as a limitation on the scope of this invention.

EXAMPLE 1

A mixture of 50 g. of 2-(4-methoxyphenyl)cyclohexanone, 500 ml. of acetic anhydride and 500 g. of sodium acetate is heated at reflux under nitrogen for four hours. At the end of this time the reaction is reduced in volume by distillation, cooled and diluted with ether. This ethereal solution is washed with water, 5% aqueous sodium bicarbonate solution and again with water and then dried over sodium sulfate and evaporated. Thus obtained is 1-acetoxy-2-(4-methoxyphenyl)cyclohex-1-ene which is purified through recrystallization from acetone:hexane.

To a stirred and refluxing solution of 10 g. of 1-acetoxy-2-(4-methoxyphenyl)cyclohex-1-ene in 100 ml. of dimethyldiethylene glycol ether, is added in a dropwise fashion and under nitrogen, a 50% w./v. solution of sodium trichloroacetate. When the addition of 5 equivalents of reagent fails to produce an appreciable change in the U.V. spectrum, the addition is stopped. The solution is cooled and filtered and the filtrate is evaporated to dryness under reduced pressure. The residue thus obtained is chromatographed on alumina, eluting with methylene chloride, to yield 1-acetoxy-6-(4-methoxyphenyl)-7,7-dichlorobicyclo[4.1.0]heptane which is further purified by recrystallization from methylene chloride:hexane.

Ten grams of 1-acetoxy-6-(4-methoxyphenyl)-7,7-dichlorobicyclo[4.1.0]heptane, 10 g. of sodium hydroxide and 250 ml. of methanol are heated at reflux for three hours. At the end of this time, the reaction mixture is poured into ice water. The solid which forms is collected by filtration, washed with water to neutrality and dried to yield 1-(4-methoxyphenyl)-2-chlorocyclohept-1-en-3-one.

A stream of acetylene is bubbled through a suspension of .12 mole of ethylmagnesium bromide in freshly distilled tetrahydrofuran for two hours. At the end of this time, the mixture is flushed with dry nitrogen and then treated under nitrogen in a dropwise fashion with 23.6 g. of 1-(4-methoxyphenyl)-2-chlorocyclohept-1-en-3-one dissolved in 100 ml. of dry tetrahydrofuran. When the addition is complete, the mixture is refluxed for one hour, cooled and cautiously treated with water. The phases are separated and the aqueous layer washed with benzene. The combined organic layer and benzene washings are washed with water, dried and concentrated by evaporation to yield 1-(4-methoxyphenyl)-2-chloro-3-ethynylcyclohept-1-en-3-ol which is recrystallized from methanol.

A mixture of 7 g. of methylene iodide and 3 g. of zinc:copper couple in 15 ml. of anhydrous ether is heated under nitrogen at reflux for three hours. At the end of the time, 2 g. of 1-(4-methoxyphenyl)-2-chloro-3-ethynylcyclohept-1-en-3-ol is added to the cooled solution. This mixture is allowed to stand at room temperature for two hours and then poured into 200 ml. of 2% aqueous sodium bicarbonate and extracted twice with 10 ml. portions of ethyl ether. These extracts are dried over sodium sulfate and evaporated under reduced pressure. The residue is held at 0.01 mm. to remove any unreacted methylene iodide and then recrystallized from hexane to yield 1-chloro-2-ethynyl-7-(4-methoxyphenyl)bicyclo[5.1.0]octan-2-ol which is further purified through recrystallization from methanol.

EXAMPLE 2

By substituting sodium chlorodifluoroacetate for sodium trichloroacetate in procedure of Example 1, there is initially obtained 1-acetoxy-6-(4-methoxyphenyl)-7,7-difluorobicyclo[4.1.0]heptane. Upon ring opening and ethynylation as therein described there is obtained 1-(4-methoxyphenyl)-2-fluoro-3-ethynylcyclohept-1-en-3-ol which when treated with methylene iodide and zinc:copper couple yields 1-fluoro-2-ethynyl-7-(4-methoxyphenyl)bicyclo[5.1.0]octan-2-ol.

EXAMPLE 3

To 2 ml. of a solution of 45.8 g. of p-(N-pyrrolidinoethoxy)chlorobenzene, and 45 ml. of tetrahydrofuran are added under nitrogen, 4.9 g. of magnesium turnings, 0.2 ml. of ethyl bromide and a small iodine crystal. Upon initiation of reaction, the remainder of the p-methoxychlorobenzene/tetrahydrofuran solution is added in a dropwise fashion, maintaining the reaction mixture at reflux temperatures. When the magnesium turnings are consumed, a solution of 46 g. of 1-(4-methoxyphenyl)-2-chlorocyclohept-1-en-3-one in tetrahydrofuran is added in a dropwise fashion, maintaining a nitrogen atmosphere. The mixture is refluxed for one hour upon completion of the addition, cooled, and cautiously treated with a saturated aqueous solution of ammonium chloride. The layers are separated and the aqueous layer is rendered alkaline and extracted with benzene. These extracts are combined with the organic layer and this combined mixture is washed with water, dried over sodium sulfate and evaporated to yield 1-(4-methoxyphenyl)-2-chloro-3-[4-(N-pyrrolidinoethoxy)phenyl]cyclohept - 1 - en-3-ol. Treatment of this compound with methylene iodide and zinc:copper couple as described in Example 1 then yields 1-chloro - 2 - [4-(N-pyrrolidinoethoxy)phenyl]-7-(4-methoxyphenyl)bicyclo[5.1.0]octan-2-ol.

In a like fashion starting with 1-(4-methoxyphenyl)-2-fluorocyclohept-1-en-3-one, there is initially obtained 1-(4-methoxyphenyl) - 2 - fluoro-3-[4-(N - pyrrolidinoethoxy)phenyl]-cyclohept-1-en-3-ol which is converted, in the analogous fashion, to 1-fluoro-2-[4-(N-pyrrolidinoethoxy)phenyl] - 7 - (4-methoxyphenyl)bicyclo[5.1.0]octan-2-ol.

EXAMPLE 4

By substituting equivalent amounts of 2-phenylcyclohexanone, 2-(4-methylphenyl)cyclohexanone, 2-(3-methoxyphenyl)cyclohexanone, 2-(4-ethoxyphenyl)cyclohexanone, 2-[4-(N - pyrrolidinoethoxy)phenyl]cyclohexanone and 2-(4-diethylaminoethoxyphenyl)cyclohexanone for 2-(4-methoxyphenyl)cyclohexanone in the procedure of Example 1, the following compounds are respectively obtained upon completion of the steps therein recited:

1-chloro-2-ethynyl-7-phenylbicyclo[5.1.0]octan-2-ol;
1-chloro-2-ethynyl-7-(4-methylphenyl)bicyclo[5.1.0]-octan-2-ol;
1-chloro-2-ethynyl-7-(3-methoxyphenyl)bicyclo[5.1.0]-octan-2-ol;
1-chloro-2-ethynyl-7-(4-ethoxyphenyl)bicyclo[5.1.0]-octan-2-ol;
1-chloro-2-ethynyl-7-[4-(N-pyrrolidinoethoxy)phenyl]-bicyclo[5.1.0]octan-2-ol; and
1-chloro-2-ethynyl-7-(4-diethylaminoethoxylphenyl)-bicyclo[5.1.0]octan-2-ol;

If these same starting materials are employed in the procedure of Example 1 and p-(N-pyrrolidinoethoxy)-phenylmagnesium chloride is employed in the manner of Example 3 in place of the ethynylmagnesium bromide recited in Example 1, the following derivatives are respectively obtained:

1-chloro-2-[4-(N-pyrrolidinoethoxy)phenyl]-7-phenyl-bicyclo[5.1.0]octan-2-ol;
1-chloro-2-[4-(N-pyrrolidinoethoxy)phenyl]-7-(4-methylphenyl)bicyclo[5.1.0.]octan-2-ol;
1-chloro-2-[4-(N-pyrrolidinoethoxy)phenyl]-7-(3-methoxyphenyl)bicyclo[5.1.0]octan-2-ol;
1-chloro-2-[4-(N-pyrrolidinoethoxy)phenyl]-7-(4-ethoxyphenyl)bicyclo[5.1.0]octan-2-ol;
1-chloro-2,7-bis[4-(N-pyrrolidinoethoxy)phenyl]-bicyclo[5.1.0]octan-2-ol and;
1-chloro-2-[4-(N-pyrrolidinoethoxy)phenyl]-7-(4-diethylaminoethoxy)bicyclo[5.1.0]octan-2-ol.

The corresponding 1-fluoro compounds are obtained if sodium chlorodifluoroacetate is used in place of sodium trichloroacetate.

EXAMPLE 5

If p-methoxychlorobenzene, p-methylchlorobenzene, m-ethylchlorobenzene and p-ethoxychlorobenzene are substituted for p-(N-pyrrolidinoethoxy) chlorobenzene in the procedure of Example 3, the following derivatives are respectively obtained:

1-chloro-2,7-bis(4-methoxyphenyl)bicyclo[5.1.0]octan-2-ol;
1-chloro-2-(4-methylphenyl)-7-(4-methoxyphenyl)-bicyclo[5.1.0]octan-2-ol;
1-chloro-2-(3-ethylphenyl)-7-(4-methoxyphenyl)-bicyclo[5.1.0]octan-2-ol; and
1-chloro-2-(4-ethoxyphenyl)-7-(4-methoxyphenyl)-bicyclo[5.1.0]octan-2-ol.

The corresponding 1-fluoro compounds are obtained by substituting 1-(4-methoxyphenyl)-2-fluorocyclohept-1-en-3-one for 1 - (4-methoxyphenyl)-2-chlorocyclohept-1-en-3-one in the procedure of Example 3 as herein modified.

EXAMPLE 6

A solution of 8.5 g. of 1,2-dichloroethylene in 50 ml. of anhydrous ether is added in a dropwise fashion, under nitrogen and at 0° C., to a stirred solution of 15 ml. of 1.4 N methyl lithium in anhydrous ether. After stirring for an additional 90 minutes at room temperature, a solution of 0.5 g. of 1-(4-methoxyphenyl)-2-fluorocyclohept-1-en-3-one in 20 ml. of anhydrous ether is added in a dropwise fashion with stirring. Stirring at room temperature is continued for 18 hours and the mixture is then poured into ice water and extracted with ether. These extracts are washed with water to neutrality, dried over sodium sulfate and evaporated to yield 1-(4-methoxyphenyl)-2-fluoro-3-chloroethynylcyclohept-1-en-3-ol. Upon subjecting this compound to the action of methylene iodide and zinc:copper couple as described in Example 1, there is obtained 1 - fluoro-2-chloroethynyl-7-(4-methoxyphenyl)-bicyclo[5.1.0]octan-2-ol.

What is claimed is:
1. A compound of the formula:

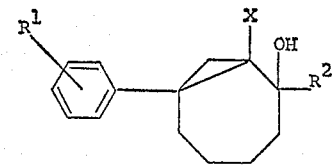

wherein $R^1$ is hydrogen, (lower)alkyl, (lower)alkoxy, di(lower)alkylamino(lower)alkoxy [or cycloalkyleneamino(lower)alkoxy], N-pyrrolidino, or N-piperidino; $R^2$ is —C≡CR³ or

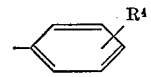

$R^3$ is hydrogen, chloro, or methyl;
$R^4$ is hydrogen, (lower)alkyl, (lower)alkoxy, di(lower)-alkylamino(lower)alkoxy [or cycloalkyleneamino(lower)alkoxyl], N-pyrrolidino, or N-piperindino; and
X is chloro or fluoro.

2. A compound of the formula:

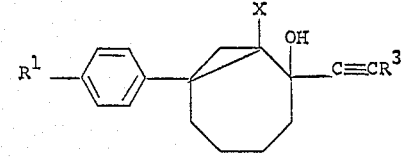

wherein $R^1$, $R^3$, and X are as defined in claim 1.

3. A compound according to claim 2 wherein $R^1$ is methoxy or N-pyrrolidinoethoxy and $R^3$ is hydrogen or chloro.

4. A compound of the formula:

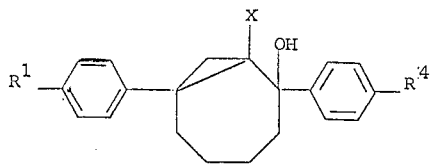

wherein $R^1$, $R^4$, and X are as defined in claim 1.

5. A compound according to claim 4 wherein each of $R^1$ and $R^4$ is methoxy or N-pyrrolidinoethoxy.

6. 1 - chloro - 2-ethynyl-7-(4-methoxyphenyl)bicyclo-[5.1.0]octan-2-ol.

7. 1 - fluoro - 2-ethynyl-7-(4-methoxyphenyl)bicyclo-[5.1.0]octan-2-ol.

8. 1 - chloro - 2-[4-(N-pyrrolidinoethoxy)phenyl]-7-(4-methoxyphenyl)bicyclo[5.1.0]octan-2-ol.

9. 1 - fluoro - 2-[4-(N-pyrrolidinoethoxy)phenyl]-7-(4-methoxyphenyl)bicyclo[5.1.0]octan-2-ol.

10. 1 - chloro-2,7-bis(4-methoxyphenyl)bicyclo [5.1.0]-octan-2-ol.

References Cited

UNITED STATES PATENTS 3,419,569   12/1968   Renner _____ 260—296

ALEX MAZEL, Primary Examiner

J. A. NARCAVAGE, Assistant Examiner

U.S. Cl. X.R.

260—294, 294.7, 326.3, 570.7, 612, 613, 618, 999